United States Patent
Szasz et al.

(10) Patent No.: US 10,732,063 B2
(45) Date of Patent: Aug. 4, 2020

(54) DEVICE FOR MEASURING THE PRESSURE OF A FLUID FLOWING THROUGH A PIPELINE

(71) Applicant: ABB Schweiz AG, Baden (CH)

(72) Inventors: Paul Szasz, Plankstadt (DE); Armin Gasch, Speyer (DE); Roberto Zucchi, Lenno (IT)

(73) Assignee: ABB SCHWEIZ AG, Baden (CH)

( * ) Notice: Subject to any disclaimer, the term of this patent is extended or adjusted under 35 U.S.C. 154(b) by 183 days.

(21) Appl. No.: 15/835,465

(22) Filed: Dec. 8, 2017

(65) Prior Publication Data

US 2018/0100777 A1    Apr. 12, 2018

Related U.S. Application Data

(63) Continuation of application No. PCT/EP2016/062981, filed on Jun. 8, 2016.

(30) Foreign Application Priority Data

Jun. 12, 2015   (DE) .................. 10 2015 109 450

(51) Int. Cl.
*G01L 11/04* (2006.01)
*G01L 11/06* (2006.01)
*G01L 27/00* (2006.01)

(52) U.S. Cl.
CPC .............. *G01L 11/06* (2013.01); *G01L 11/04* (2013.01); *G01L 27/005* (2013.01)

(58) Field of Classification Search
CPC .................................. G01L 11/04; G01L 11/06
See application file for complete search history.

(56) References Cited

U.S. PATENT DOCUMENTS

| 2,420,148 A | 5/1947 | Ostergren |
| 3,977,252 A | 8/1976 | Krylova et al. |

(Continued)

FOREIGN PATENT DOCUMENTS

| CN | 1890545 A | 1/2007 |
| CN | 1898535 A | 1/2007 |

(Continued)

*Primary Examiner* — Herbert K Roberts
(74) *Attorney, Agent, or Firm* — Leydig, Voit & Mayer, Ltd.

(57) ABSTRACT

In an embodiment, the present invention provides a device for measuring the pressure p of a fluid flowing through a pipeline, including: at least one primary sensor arranged on an outer periphery of the pipeline for measuring a primary physical measured variable which is dependent on the pressure p, the absolute value of the pressure p being obtainable by offsetting said primary physical measured variable against at least one calibration datum, the at least one calibration datum relating to the geometry and/or to at least one material property of the pipeline; and a calibration datum determining unit and an evaluation unit for determining the pressure p from the primary physical measured variable in conjunction with the calibration datum. The calibration datum determining unit includes a measuring pipe which can be fluidically connected to the pipeline, which differs from the rest of the pipeline in material and/or in cross-sectional geometry.

11 Claims, 2 Drawing Sheets

Fig. 2

(56) References Cited

U.S. PATENT DOCUMENTS

| | | |
|---|---|---|
| 4,420,980 A | 12/1983 | Dunemann et al. |
| 4,738,140 A | 4/1988 | Kempf |
| 5,309,916 A | 5/1994 | Hatschek |
| 7,093,496 B2 | 8/2006 | Hindman |
| 2005/0132808 A1 | 6/2005 | Brown et al. |
| 2005/0235755 A1 | 10/2005 | Hindman |
| 2006/0070448 A1 | 4/2006 | Baumann et al. |
| 2006/0173639 A1* | 8/2006 | Carpenter ............. G01F 1/8413 702/50 |
| 2007/0079747 A1 | 4/2007 | Pellicciari |
| 2013/0333440 A1 | 12/2013 | Hedtke |
| 2014/0360279 A1* | 12/2014 | Jenkins ..................... G01L 1/22 73/756 |

FOREIGN PATENT DOCUMENTS

| | | |
|---|---|---|
| CN | 101900617 A | 12/2010 |
| CN | 202869733 U | 4/2013 |
| CN | 103245454 A | 8/2013 |
| CN | 104458108 A | 3/2015 |
| DE | 2552315 A1 | 7/1976 |
| DE | 19631018 A1 | 2/1998 |
| DE | 102009026968 A1 | 12/2009 |
| DE | 102009026692 A1 | 12/2010 |
| DE | 102009029346 A1 | 3/2011 |
| EP | 0049501 B1 | 4/1982 |
| EP | 0088362 A1 | 9/1983 |
| EP | 0210523 A1 | 2/1987 |
| EP | 0467853 A1 | 1/1992 |
| EP | 720006 A1 | 7/1996 |
| EP | 1657537 A1 | 5/2006 |
| EP | 1948924 B1 | 7/2008 |
| EP | 2629074 A1 | 8/2013 |
| FR | 2215615 A | 8/1974 |
| WO | WO 1998037395 A1 | 8/1998 |
| WO | WO 2004011894 A1 | 2/2004 |
| WO | WO 2014197760 A1 | 12/2014 |

* cited by examiner

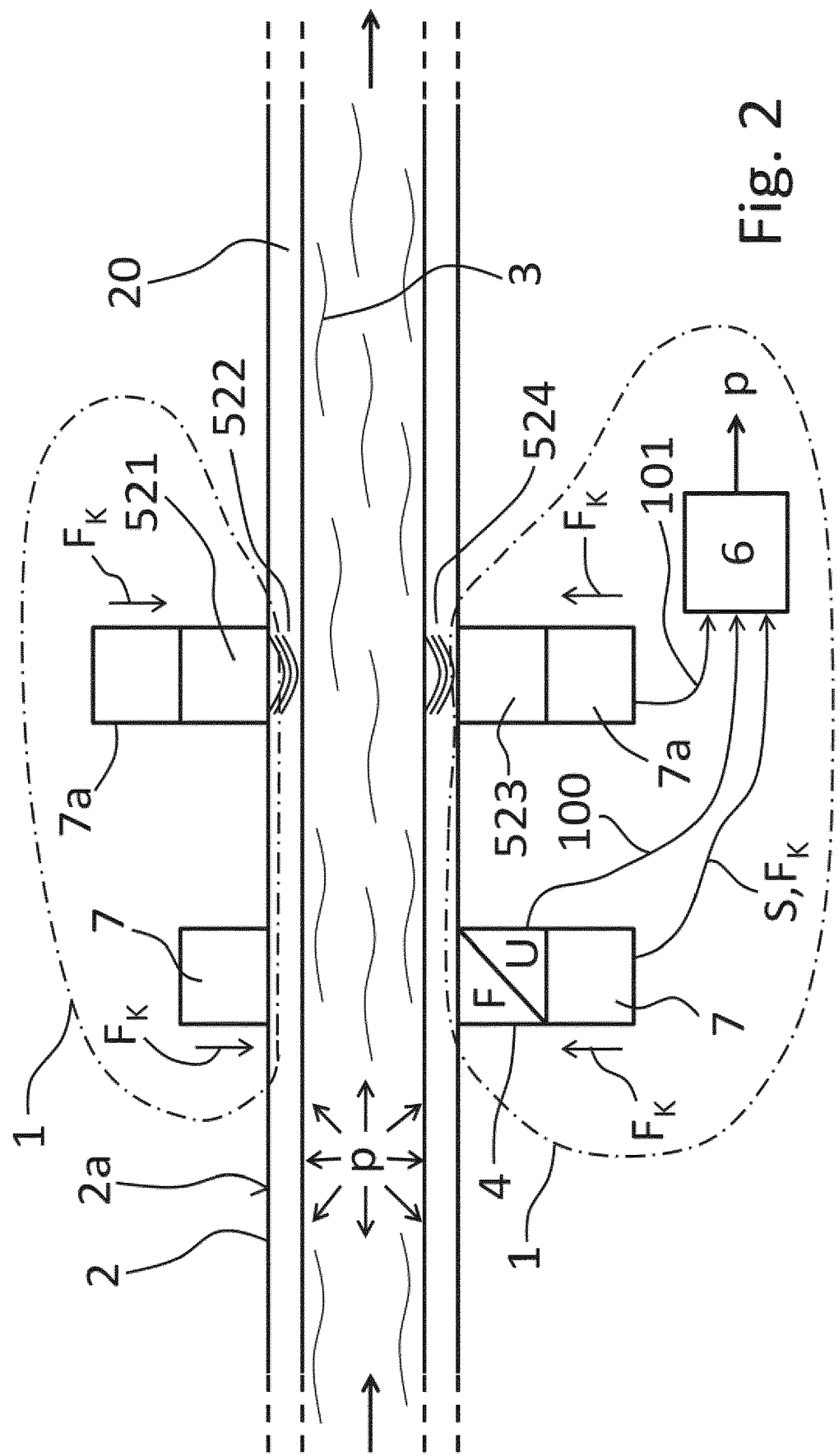

DEVICE FOR MEASURING THE PRESSURE OF A FLUID FLOWING THROUGH A PIPELINE

CROSS-REFERENCE TO PRIOR APPLICATION

This application is a continuation of International Patent Application No. PCT/EP2016/062981, filed on Jun. 8, 2016, which claims priority to German Patent Application No. DE 10 2015 109 450.9, filed on Jun. 12, 2015, the entire disclosures of which are hereby incorporated by reference herein.

FIELD

The invention relates to a device by means of which, in industrial applications, the pressure of a fluid flowing in a pipeline can be measured without direct contact with said fluid.

BACKGROUND

In many industrial processes, the pressure of a fluid flowing in a pipeline must be monitored. For this purpose, a sensor is typically guided into the fluid through the wall of the pipeline. Such apertures through the wall must be sealed against leaks. This makes monitoring pressure labor-intensive.

Therefore, attempts are often made to measure the pressure of the fluid non-invasively, that is to say without direct contact between the sensor and the fluid. Thus, a compact measuring device is known for example from U.S. Pat. No. 7,093,496 A, which device can be applied to an outer periphery of the pipeline by means of a clamp. The clamping force acting between the pipeline and the clamp is measured by a force sensor. This clamping force increases as the pressure in the pipeline rises, since the pipeline expands radially.

EP 88 362 A1 discloses a non-invasive pressure measurement by means of a frequency shift of vibration modes of the pipeline. Vibrations are induced in the pipeline by a variable excitation frequency, and the resonance frequency is determined.

Non-invasive pressure measurements are also further disclosed in FR 2 215 615 A, in WO 1998 037 395 A1, in EP 1 948 924 B1, in EP 210 523 A1, in EP 49 501 B1, in EP 720 006 A1, in DE 10 2009 026 968 A1, in EP 1 657 537 A1 and in DE 10 2009 029 346 A1.

What all the devices and methods disclosed therein have in common is that they react to changes in pressure more or less sensitively, but are not suitable for monitoring absolute pressures in industrial processes because there are too many measurement uncertainties. These uncertainties can be a multiple of 10% of the total measurement range.

SUMMARY

In an embodiment, the present invention provides a device for measuring the pressure p of a fluid flowing through a pipeline, comprising: at least one primary sensor arranged on an outer periphery of the pipeline being configured to measure a primary physical measured variable which is dependent on the pressure p, the absolute value of the pressure p being obtainable by offsetting said primary physical measured variable against at least one calibration datum, the at least one calibration datum relating to the geometry and/or to at least one material property of the pipeline; and a calibration datum determining unit and an evaluation unit configured to determine the pressure p from the primary physical measured variable in conjunction with the calibration datum, wherein the calibration datum determining unit comprises: a measuring pipe which can be fluidically connected to the pipeline, which differs from the rest of the pipeline in material and/or in cross-sectional geometry, and for which the calibration datum is known, the primary sensor being arranged on an outer periphery of the measuring pipe; and/or at least one calibration sensor arranged on the outer periphery of the pipeline or of the measuring pipe, which sensor is physically sensitive to the calibration datum.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 2 shows an embodiment of the device according to the invention comprising a calibration sensor.

DETAILED DESCRIPTION

Figure 1:
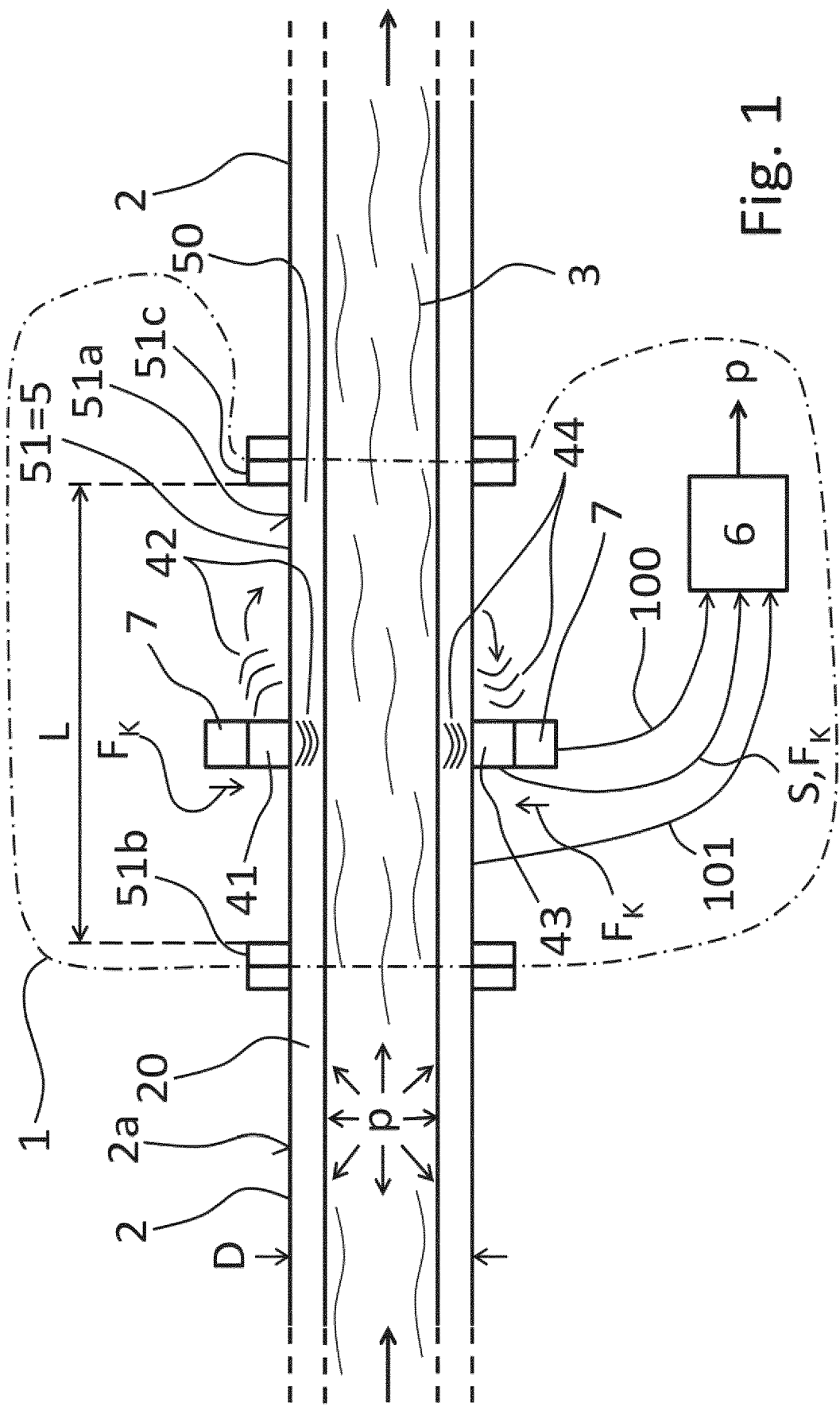
FIG. 1 shows an embodiment of the device according to the invention comprising a measuring pipe integrated in the pipeline.

The present invention provides a device for measuring the pressure p of a fluid flowing through a pipeline has been developed. Said fluid can be a liquid, a gas or a mixture of liquid and gas phases. The fluid can also have an intermediate state between the liquid and gaseous states of matter.

The device comprises at least one primary sensor arranged on an outer periphery of the pipeline for measuring a primary physical measured variable which is dependent on the pressure p. By offsetting this primary physical measured variable against at least one calibration datum, the absolute value of the pressure p can be obtained.

In this case, the calibration datum relates to the geometry and/or to at least one material property of the pipeline. Both the geometry and the material properties can affect the extent to which a pressure p inside the pipeline spreads into a change in the signal registered by the sensor on the outer periphery of the pipeline. Therefore, a calibration datum determining unit and an evaluation unit which determines the pressure p from the primary physical measured variable in conjunction with the calibration datum are provided.

According to the invention, in a first embodiment, the calibration datum determining unit comprises a measuring pipe which can be fluidically connected to the pipeline, which differs from the rest of the pipeline in terms of material and/or in terms of cross-sectional geometry, and for which the calibration datum is known. In this case, the primary sensor is arranged on an outer periphery of the measuring pipe.

It has been recognized that the production-related variation in the geometry and in the material properties of pipelines for industrial use is a main cause of the major measuring uncertainties in non-invasive pressure measurements. Typically, for reasons of economy, such pipelines are specified with large enough production tolerances that they are compatible with respective applications; it would be possible to produce pipelines with narrower tolerances, but this would greatly push up the price. This problem arises specifically when retrofitting a non-invasive pressure measurement, since the geometry and the material composition of the pipeline in the location of the measurement are known only imprecisely. The measuring pipe provided according to the invention is now optimized in terms of the geometry and the material properties thereof in order to considerably reduce the uncertainties in the non-invasive pressure measurement. Said pipe can be produced for example with a particularly narrow tolerance, from an elementary metal instead of an alloy having a potentially variable composition and/or can have geometric symmetries which lead to a large proportion of the measuring uncertainties being averaged out. Consequently, per unit length, the measuring pipe is much more expensive than the actual pipeline. For this reason, the measuring pipe must be at most a few meters long, whereas the actual pipeline can have a length of several kilometers. The pressure p in the actual pipeline and in the measuring pipe is identical as a result of the fluid connection; due to the arrangement of the primary sensor on the outer periphery of the measuring pipe, the pressure measurement is relocated to a workbench provided specifically for this purpose, on which workbench said measurement can be carried out with substantially more accuracy.

Alternatively or in combination with this measuring pipe, in a second embodiment, the calibration datum determining unit comprises at least one calibration sensor arranged on an outer periphery of the pipeline or of the measuring pipe, which sensor is physically sensitive to the calibration datum. In this case for example, the same sensor can also be used both as the primary sensor and as the calibration sensor, the calibration sensor having for example a different activation or evaluation. A calibration sensor on the outer periphery of the pipeline provides the advantage that, other than when inserting the measuring pipe, it is no longer necessary to intervene in the circuit of the fluid. Thus, in particular retrofitting an existing industrial system with a non-invasive pressure measurement is particularly simple. The industrial process must not be interrupted. Furthermore, by means of the calibration sensor, it is also possible to establish whether the properties of the pipeline change over time as a result of ageing or wear. Some complex and expensive systems in particular have been in operation for periods of 50 years or more. During this time, for example the wall thickness of the pipeline can be thinned from within by the flowing fluid due to mechanical ablation, or the material of the pipeline can become for example brittle or depleted by chemical attack by the fluid.

In a particularly advantageous embodiment of the invention, the primary sensor is physically sensitive to mechanical stress, strain, deformation and/or a change in a diameter D of the pipeline or of the measuring pipe. Changes in these properties are directly related to forces which are exerted as a result of the pressure (force per unit area) on the inner wall of the pipeline or of the measuring pipe. Offsetting the measurement value supplied by the primary sensor against the calibration datum to obtain the absolute value of the pressure p is then particularly simple.

In another particularly advantageous embodiment of the invention, the primary sensor and/or the calibration sensor comprise at least one transmitter for coupling sound waves into the pipeline and/or into the measuring pipe and at least one receiver for measuring the response of the pipeline or of the measuring pipe to said sound waves. In this case, the sound waves can propagate in a straight line through the pipeline or through the measuring pipe including the fluid located therein, along the outer wall of the pipeline or of the measuring pipe, or in any combination of both routes. By means of the frequency of the sound waves used, it is possible to select which primary physical measured variable or which calibration datum to retrieve. In particular, the same sensor can be used to retrieve various variables by excitation with a plurality of frequency components at the same time or one after the other.

In a particularly advantageous embodiment of the invention, the transmitter has a variable frequency, and/or the emission spectrum thereof is continuous at least within a frequency interval. Advantageously, the receiver is frequency sensitive. By means of these measures, either in isolation or in combination, it is possible to find out the frequency at which a resonance can be excited in the pipeline and/or in the measuring pipe. This resonance frequency is much less sensitive to disruptive influences than a measurement of the response in the case of only one frequency or for example the measurement of a force interaction between the pipeline or the measuring pipe on the one hand and the sensor on the other.

In particular, changes in the mechanical stress, a diameter or a resonance frequency for a vibration mode of the pipeline or of the measuring pipe are very closely correlated with the internal pressure p. This correlation is linear with an accuracy of 1% or better, and the repeat accuracy is also of the same order of magnitude. This also applies when the pipeline or the measuring pipe is oval or when the wall thickness or other parameters change locally. Due to these changes according to the azimuthal position along the outer periphery, the absolute value of the pressure p previously could be determined only imprecisely. In particular, said value varied from pipeline to pipeline due to the production tolerances. Due to the fact that, according to the invention, the calibration datum is determined in an improved manner, the effect of this and other sources of error can be rectified, and the absolute value of the pressure p can be determined more precisely.

In another particularly advantageous embodiment of the invention, at least one clamping device is provided for fixing the primary sensor and/or the calibration sensor on the outer periphery of the pipeline and/or of the measuring pipe.

The clamping device can then press in particular the primary sensor or the calibration sensor onto the pipeline or onto the measuring pipe with such a clamping force FK that the adhesion caused by said clamping force FK reliably prevents the sensor from moving out of place due to gravity, vibrations or impacts. In this case, there is no need to interfere with the integrity and thus in particular the impermeability of the pipeline or of the measuring pipe. The fixing is thus also suitable for temporary structures.

Advantageously, the primary sensor and/or the calibration sensor is physically sensitive to a clamping force FK acting between the pipeline or the measuring pipe on the one hand and the clamping device on the other. As explained previously, this clamping force FK is directly affected by the pressure p of the fluid inside the pipeline or the measuring pipe.

Advantageously, the evaluation unit receives the rigidity S of the clamping device, the clamping force FK and/or at least one mechanical material constant of the primary sensor and/or of the calibration sensor as an input. By taking these variables into account, the accuracy of the absolute value of the pressure p determined by the evaluation unit can be increased even further.

In another particularly advantageous embodiment of the invention, the calibration sensor is configured for the ongoing monitoring of the calibration datum during the operation of the pipeline or of the measuring pipe. This monitoring can take place continuously, but also intermittently at any desired time intervals. Thus, it is firstly possible to prevent changes in the pipeline or the measuring pipe as a result of wear or ageing from continuing to impair the measuring accuracy for the pressure p in a creeping manner. Such changes can occur on the pipeline or on the measuring pipe for example when the fluid is particularly chemically aggressive, the pipeline or the measuring pipe is exposed to frequently extreme temperatures and/or frequent pressure pulsations in the fluid are transmitted to the wall of the pipeline or of the measuring pipe. Secondly, knowledge of changes in the pipeline or in the measuring pipe is also useful for the industrial process itself and can indicate for example that maintenance will be required.

Advantageously, the calibration datum includes one or more variables from the group comprising E-modulus, Poisson's ratio, wall thickness and/or cross-sectional geometry of the pipeline and/or of the measuring pipe, and/or distributions of these variables, and/or includes a length L of the pipeline or of the measuring pipe between adjacent flanged connections and/or apertures through the outer periphery of the pipeline or of the measuring pipe. The E-modulus and the Poisson's ratio are the most important elastic parameters, by means of which it is possible to calculate the extent to which the pipeline or the measuring pipe is deformed at a given pressure p. The extent of this deformation is also co-determined by the wall thickness and/or by the cross-sectional geometry of the pipeline or of the measuring pipe. Due to the production tolerances, all of these variables can change statically along the longitudinal axis of the pipeline or of the measuring pipe, but also on a route along the outer periphery of the pipeline or of the measuring pipe. The length between adjacent flanged connections and/or apertures through the outer periphery indicates what is known as the uninterrupted length of the pipeline or of the measuring pipe. Along the uninterrupted length, the pipeline or the measuring pipe can be assumed to be homogeneous, and optionally existing symmetries can be used.

In another particularly advantageous embodiment of the invention, the evaluation unit receives at least one fault tolerance of the primary physical measured variable, and/or the calibration datum, as an input. In this case, the evaluation unit can be configured in particular to weight a plurality of calibration data with the fault tolerances thereof. For example, the evaluation unit can receive tolerances of the geometry of the pipeline or of the measuring pipe, the wall thickness of the pipeline or of the measuring pipe, or also the clamping force FK as an input. The more information the evaluation unit receives, the more the measuring uncertainties can be reduced. Lastly, for the absolute pressure p, a measuring accuracy of a few percent, preferably of 1% or better, can be achieved. To rectify the measuring uncertainties, the evaluation unit can use for example functional relationships between calibration data and primary physical measured variables. These functional relationships can be stored in the evaluation unit for example as analytical formulae. However, said relationships can for example also be stored therein in a characteristic map. The evaluation unit can also contain for example a neuronal network which automatically learns the relationships between a plurality of calibration data and one or more physical measured variables.

Advantageously, the pipeline and/or the measuring pipe has a round cross section. In the case of an oval cross section of the pipeline and/or of the measuring pipe, at the location along the outer periphery at which the diameter assumes a minimum, the relative change in said diameter is at its greatest in the event of a change in pressure of the fluid. If the primary sensor is thus advantageously arranged at least in part at this location, then the resolution of the pressure measurement can be increased.

In particular, ultrasonic sensors and arrays of ultrasonic sensors are suitable as calibration sensors. However, for example optical or magnetic calibration sensors can also be used. The calibration sensors can be used once in the installation of the device, but also at any other time during operation. The known calibration datum, or the set of known calibration data, of a measuring pipe can be supplied together with the measuring pipe for example by the manufacturer of the measuring pipe. This information can be stored for example on an electronic memory unit having an interface which can be connected to the evaluation unit and which can transmit information to the evaluation unit, or said information can be contained on a data storage medium which is supplied to the evaluation unit.

The measuring pipe can be detachably connected to the pipeline by means of a flanged connection, but also permanently integrated in said pipeline, for example by welding.

The primary sensor can be for example a strain gauge. Said sensor measures an expansion of the pipeline or of the measuring pipe as a result of the internal pressure. However, the expansion can also be measured optically, for example by correlating multiple images using DICT (digital image correlation technology) or by optical strain measurement. A change in the outside diameter of the pipeline or of the measuring pipe can be measured for example by a distance sensor, which can operate for example capacitively, or by measuring the clamping force FK between the pipeline or the measuring pipe and a clamping device. The response of the pipeline or of the measuring pipe to sound waves can be measured for example by an electrodynamic sensor or by an acceleration sensor.

Both the primary sensor and the calibration sensor can each be composed of a plurality of individual sensors. These can be arranged in particular in various azimuthal and/or axial positions along the outer periphery of the pipeline or of the measuring pipe. The effect of location-dependent variations on the measurement result can be further reduced as a result. For example, the evaluation unit can be configured to carry out median formation or averaging over the measured values supplied by a plurality of sensors, or else to underweight measured values from a sensor which differ extremely from the measured values from all the other sensors.

FIG. 1 shows a first embodiment of the device 1 according to the invention 1 for measuring the pressure p of a fluid 3 in a pipeline 2. The pipeline 2 has a wall 20 having an outer periphery 2a and an outside diameter D. By means of flanges 51b and 51c, the measuring pipe 51 is inserted in the pipeline 2, which pipe is used in this case as a calibration datum determining unit 5 for determining the calibration datum 101. The measuring pipe 51 has a wall 50 having an outer periphery 51a, the wall 50 nominally having the same wall thickness and the same outside diameter D as the wall 20 of the pipeline 2. However, the measuring pipe 51 has been produced with substantially narrower geometric production tolerances than the pipeline 2, and it consists of an alloy which meets the process requirements and which has precisely known elastic properties. These elastic properties, together with the precisely known geometry of the measuring pipe 51, form a set of parameters which is used as the calibration datum 101.

In this embodiment, the primary sensor 4 comprises a transmitter 41 for coupling sound waves 42 into the measuring pipe 51 and a receiver 43 for measuring the response 44 of the measuring pipe 51 to the sound waves 42. In this case, the sound waves propagate both in a straight line through the measuring pipe 51 and the fluid 3 contained therein and along the outer periphery 51a of the measuring pipe 51.

If the pressure p in the measuring pipe 51 rises, then the elastic properties thereof change. In particular, the resonance frequency thereof changes, just as the resonance frequency of a string of a musical instrument changes as a result of a mechanical force being exerted. When the excitation amplitude of the transmitter 41 stays the same, the amplitude of the signal registered by the receiver 43 is at a maximum if the transmission frequency corresponds to the resonance frequency of the measuring pipe 51. The frequency-dependent amplitude is supplied to the evaluation unit 6 as a primary physical measured variable 100. The primary sensor can also be a strain sensor, which supplies the peripheral strain of the measuring pipe 51 to the evaluation unit 6 as a primary physical measured variable 100.

The transmitter 41 and the receiver 43 are fixed by means of a clamping device 7 which exerts a clamping force FK directed in the direction of the outer periphery 51a of the measuring pipe 51. The rigidity S of said clamping device 7 and the clamping force FK change the coupling of sound waves 42 on the transmitter 41 and the decoupling of sound waves 44 into the receiver 43. The rigidity S and the clamping force FK are therefore supplied to the evaluation unit 6 as additional inputs. The evaluation unit 6 determines the absolute value of the pressure p.

FIG. 2 shows another embodiment of the device according to the invention. In contrast to FIG. 1, the pipeline 2 is formed in one piece in this case and does not contain a measuring pipe 51. In this embodiment, the primary sensor 4 is a force or strain sensor which is pressed onto the outer periphery 2a of the pipeline 2 by means of a first clamping device 7 with a clamping force FK. The primary sensor 4 converts a force F or a strain ε into a voltage U, which is supplied to the evaluation unit 6 as a primary measured variable 100.

Analogously to FIG. 1, the rigidity S and the clamping force FK of the clamping device 7 are used as additional inputs which are supplied to the evaluation unit 6.

Instead of the measuring pipe 51, a calibration sensor 52 is now provided, which is composed of a transmitter 521 and a receiver 523 for ultrasonic waves 522, 524. The transmitter 521 couples the ultrasonic waves 522 through the outer periphery 2a into the wall 20 of the pipeline 2. The response 524 thereto is registered by the receiver 523. The proportion of the ultrasonic waves 522 which propagate only inside the wall 20 from the transmitter 521 to the receiver 523 and do not pass the fluid 3 are not shown for the sake of clarity. The travel times of the signals registered by the receiver 523 are the calibration data 101 which are supplied to the evaluation unit 6. The transmitter 521 and the receiver 523 are pressed onto the outer periphery 2a of the pipeline 2 by means of a second clamping device 7a with a clamping force FK.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 1 measuring device
2 pipeline
2a outer periphery of the pipeline 2
20 wall of the pipeline 2
3 fluid
4 primary sensor
41 transmitter for sound waves 42
42 sound waves
43 receiver for response 44
44 response of the measuring pipe to the sound waves 42
5 calibration datum determining unit for determining the calibration datum 101
50 wall of the measuring pipe 51
51 measuring pipe
51a outer periphery of the measuring pipe 51
51b, 51c flange of the measuring pipe 51
52 calibration sensor
521 transmitter of the calibration sensor 52 for ultrasonic waves 522
522 ultrasonic waves
523 receiver for response 524
524 response of the pipeline 2 to the ultrasonic waves 522
6 evaluation unit
7, 7a clamping device
100 primary physical measured variable
101 calibration datum
D diameter
F force
FK clamping force
p pressure
S rigidity of the clamping device 7, 7a
U voltage

What is claimed is:

1. A device for measuring the pressure p of a fluid flowing through a pipeline, comprising:
at least one primary sensor configured to measure a primary physical measured variable which is dependent on the pressure p, the absolute value of the pressure p being obtainable by offsetting said primary physical measured variable against at least one calibration datum, the at least one calibration datum relating to the geometry and/or to at least one material property of the pipeline; and a calibration datum determining unit and an evaluation unit configured to determine the pressure p from the primary physical measured variable in conjunction with the calibration datum, wherein, the calibration datum determining unit comprises a measuring pipe which can be fluidically connected to the pipeline, which differs from the rest of the pipeline in material and/or in cross-sectional geometry, and for which the calibration datum is known, wherein the at least one primary sensor is arranged on an outer periphery of the measuring pipe; and/or wherein, the at least one primary sensor is arranged on an outer periphery of the pipeline and wherein the calibration datum determining unit comprises at least one calibration sensor arranged on the outer periphery of the pipeline, which sensor is physically sensitive to the calibration datum, wherein the primary sensor, and/or the calibration sensor, comprises a transmitter configured to couple sound waves into the pipeline and/or into the measuring pipe, and a receiver configured to measure a response of the pipeline and/or of the measuring pipe to the sound waves, wherein the at least one receiver is frequency sensitive and configured to provide a frequency dependent amplitude response of the sound waves to the evaluation unit;

wherein, the device further comprises at least one clamping device configured to fix the transmitter and receiver onto the outer periphery of the pipeline and/or of the measuring pipe, wherein the evaluation unit is configured to receive as inputs a rigidity of the at least one clamping device and a clamping force of the at least one clamping device, and wherein determination of the absolute value of the pressure by the evaluation unit comprises utilization of the frequency dependent amplitude response of the sound waves, the rigidity of the at least one clamping device and the clamping force of the at least one clamping device.

2. The device according to claim 1, wherein the primary sensor is physically sensitive to a mechanical stress, strain, deformation, and/or a change in a diameter D of the pipeline or of the measuring pipe.

3. The device according to claim 1, wherein the transmitter has a variable frequency and/or wherein an emission spectrum of the transmitter is continuous at least within a frequency interval.

4. The device according to claim 1, wherein the primary sensor and/or the calibration sensor is physically sensitive to a clamping force FK acting between the pipeline or the measuring pipe on the one hand and the clamping device on the other.

5. The device according to claim 3, wherein the evaluation unit is configured to receive as an input at least one mechanical material constant of the primary sensor and/or of the calibration sensor.

6. The device according to claim 1, wherein the at least one calibration sensor is configured for an ongoing monitoring of the calibration datum during the operation of the pipeline or of the measuring pipe.

7. The device according to claim 1, wherein the calibration datum includes one or more variables from the group comprising E-modulus, Poisson's ratio, wall thickness, and/or cross-sectional geometry of the pipeline and/or of the measuring pipe, and/or distributions of these variables, and/or a length L of the pipeline and/or of the measuring pipe between adjacent flanged connections and/or apertures through the outer periphery of the pipeline or of the measuring pipe.

8. The device according to claim 1, wherein the evaluation unit is configured to receive as an input at least one fault tolerance of the primary physical measured variable, and/or of the calibration datum.

9. The device according to claim 5, wherein the evaluation unit is configured to weight a plurality of primary physical measured variables and/or a plurality of calibration data with the fault tolerances thereof.

10. The device according to claim 1, wherein the pipeline and/or the measuring pipe has an oval cross section.

11. The device according to claim 7, wherein the primary sensor is arranged at least in part at a location along the outer periphery at which a diameter D of the pipeline or of the measuring pipe assumes a minimum.

* * * * *